March 31, 1953 O. J. DE SYLVA 2,633,431

MAGNETIC RECORDING TAPE AND METHOD OF MAKING SAME

Filed Dec. 20, 1947 2 SHEETS—SHEET 1

INVENTOR.
Oscar J. De Sylva,
BY
Cromwell, Greist & Warden
Attys.

March 31, 1953 — O. J. DE SYLVA — 2,633,431

MAGNETIC RECORDING TAPE AND METHOD OF MAKING SAME

Filed Dec. 20, 1947 — 2 SHEETS—SHEET 2

INVENTOR.
Oscar J. De Sylva,
BY
Cromwell, Greist & Warden
Attys.

Patented Mar. 31, 1953 2,633,431

UNITED STATES PATENT OFFICE 2,633,431

MAGNETIC RECORDING TAPE AND METHOD OF MAKING SAME

Oscar Joseph De Sylva, Mount Vernon, Ohio, assignor to Shellmar Products Corporation, Chicago, Ill., a corporation of Delaware Application December 20, 1947, Serial No. 793,035

5 Claims. (Cl. 117—64)

This invention relates to a method of coating web or sheet material, and articles made therefrom for the purpose of magnetically recording and reproducing sounds. More particularly, it has to do with a method, and articles produced by such method, in which an overall coating composition of viscous material containing a dispersion of magnetic sensitive particles is applied onto a sheet or web of suitable material adapted to receive the same which can be made into magnetic recording and reproducing tapes, disks, platens or records for recording and reproducing sounds whether oral, musical, or any other sounds which it is intended to record and reproduce by means of recording and reproducing machines made for such purposes.

One type of recording and reproducing machine, now being manufactured and sold for such purposes, magnetically records sounds impressed upon a steel tape or wire wound upon a spool. The sounds can be reproduced by reversing the direction of the steel tape or wire through the same or another similar machine. Briefly, such steel tapes or wires are prepared for recording and reproducing sounds by passing sound waves through a microphone to a recording head. The impulses passing from the microphone to the recording head preferably are first amplified and the recording head then converts the sound waves into electromagnetic impressions upon the blank tape or wire as it is being run from a spool past the recording head to be rewound in the form of a recorded tape or wire onto another spool. The means for the reproduction of such recorded sound, or the play-back hook-up, may be identical with the recording hook-up except that a loud speaker is substituted for the microphone. The microphone or transmitting device can also be hooked up with the loud speaker circuit and connected or disconnected by means of a suitable switch. Further details regarding such devices are deemed to be unnecessary.

Steel tapes and wires have certain disadvantages regarding cost, play-back or reproducing qualities, handling ease, and the like. It would be a distinct improvement to overcome such disadvantages and this is accomplished by means of the present invention.

A principal object of the invention is preferably to provide a recording tape, and a method for producing the same, in which a coating composition of viscous material containing a dispersion of magnetic sensitive particles is applied onto a sheet or web, subsequently to be made into such tape, so that proper concentration and substantially equalized dispersion of the particles is provided to obtain maximum uniformity in magnetic recording power and volume response.

Another object of the invention is to provide such tape from a suitable sheet or web having a coating composition of dispersed magnetic sensitive particles comprising a priming coat, or first layer, and at least two similar individual layers thereon, which layers and priming coat form a composite unit, whereby to provide proper concentration and dispersion of the particles and sufficient thickness of the composite layers in order to obtain maximum uniformity in magnetic recording power and volume response.

Another object of the invention is to provide such a tape from a suitable sheet or web having a coating composition of dispersed magnetic sensitive particles comprising a priming coat, or first layer, and at least two dissimilar individual layers thereon which will not react with each other, which layers and priming coat form a composite unit, whereby to provide proper concentration and dispersion of the particles and sufficient thickness of the composite layers in order to obtain maximum uniformity in magnetic recording power and volume response.

Another object of the invention is to apply a coating composition such as that above described to a suitable sheet or web, which is cellulosic or plastic in character, in such a manner that any imperfections in the sheet or web will not be reflected in the ultimate surface of the coating composition to such an extent that it will not destroy the effectiveness of the coating.

Other objects of the invention will in part be obvious and will in part appear hereinafter.

The invention accordingly comprises the several steps and the relation of one or more of such steps with respect to each of the others, and the article possessing the features, properties, and the relation of constituents, which are exemplified in the following detailed disclosure, and the scope of the application of which will be indicated in the claims.

For a fuller understanding of the nature and objects of the invention reference should be had to the following detailed description taken in connection with the accompanying drawings, in which.

Figures 1, 2:
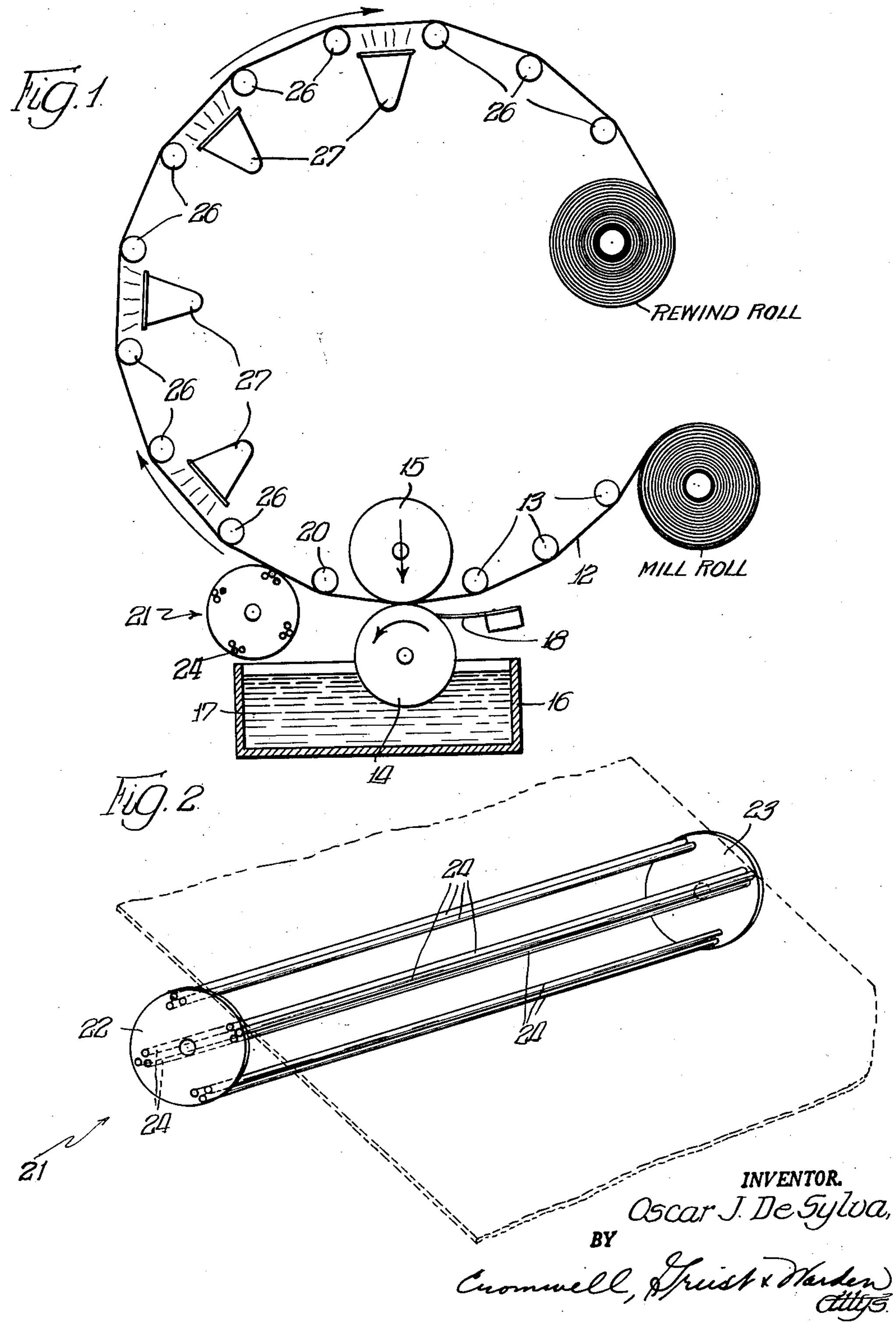
Fig. 1 is a diagrammatic representation of a suitable form of machine or apparatus for practicing the invention.
Fig. 2 is a perspective view illustrating a leveling device with leveling bars for use in conjunction with the machine or apparatus depicted in Fig. 1, and a sheet or web of coated material, shown in dotted line position, passing across the leveling device.
Figure 3:
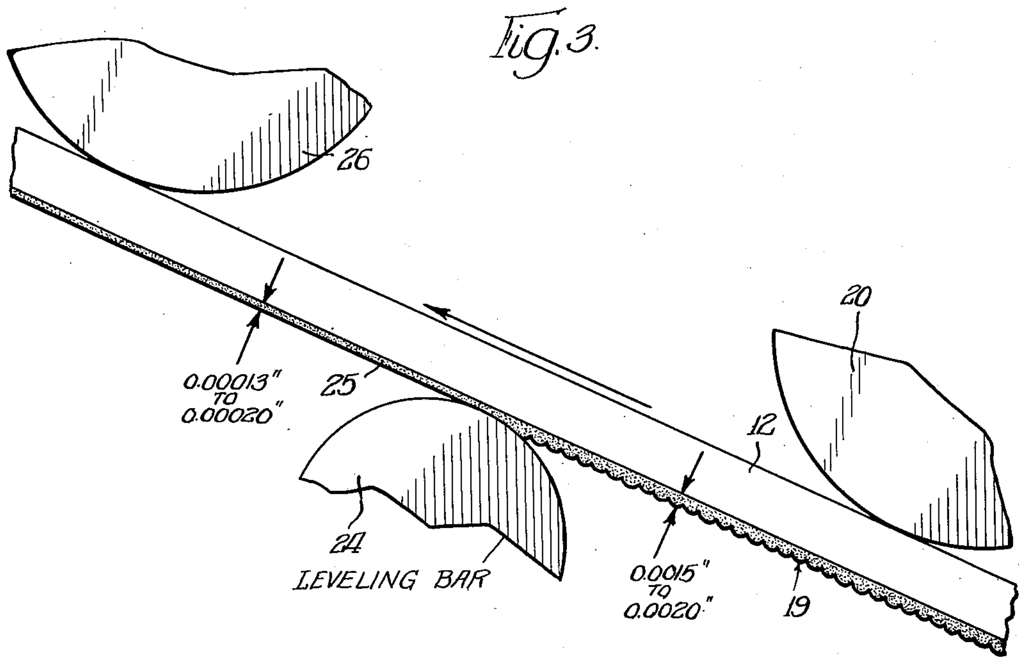
Figure 4:
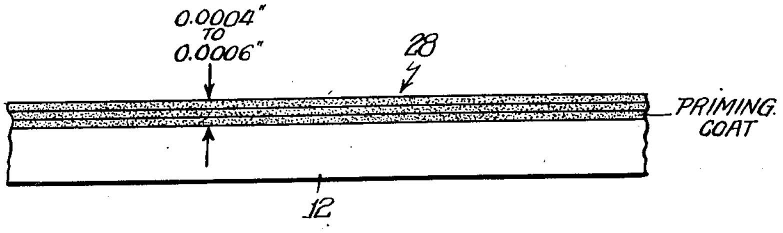

Fig. 3 is a fragmentary view, greatly enlarged, of a web or sheet of material having applied thereto a priming layer or coat of a viscous composition bearing a dispersion of magnetic particles passing across one of the leveling bars of a leveling device such as that shown in Fig. 2; and Fig. 4 shows a section, also greatly enlarged, of a sheet or web of the type shown in Fig. 3, having at least three layers applied thereto.

Preferably, the web to be coated is a super calendered paper stock but any suitable web or sheet material or transparent film, such as cellulose acetate, cellophane, or even plastic sheeting can be used to practice the invention.

In order to obtain an initial deposit or priming coat which is uniform in thickness a gravure cylinder should be used, preferably having a cell depth in the neighborhood of about 0.006 to 0.007 of an inch.

Referring more particularly to Fig. 1 of the drawings, there is shown a web or sheet 12 coming off a mill roll and passing along idler rollers 13 between an etched gravure cylinder 14 and a pressure roller 15.

The gravure cylinder is rotated in a tank 16 containing a bath of coating composition 17. The cylinder is wiped by a doctor blade 18.

A suitable coating composition of viscous material containing a dispersion of magnetic sensitive particles may comprise, for example, a formula such as the following:

| | Parts by weight |
|---|---|
| 1. Metallic oxide pigment dispersion | 100.0 |
| 2. A solution of 40% isobutyl methacrylate in toluene (B-72 acryloid)—(Resinous Products Corp). | 20.0 |
| 3. Nitrocellulose solution (Shellmar Products Corps.)—(903 NN) | 23.0 |
| 4. Ethyl alcohol and ethyl acetate (solvent additives to control viscosity) | 24.0 |

The web 12 as it passes between the rollers 14 and 15 will acquire an overall coating 19 as indicated in Fig. 3. The coating composition when so applied appears, as shown, as a series of rounded hemispherical deposits due to the nature of the cell structure of the etched cylinder 14. In applying such a coating I have found that it is essential that the wet thickness of such a deposit should fall within a range of about 0.0015 to 0.0020 of an inch. This thickness range is less than the cell depth structure of the cylinder 14 but such a cell depth will, as a practical matter, deposit a coating of about such thickness.

The web or sheet 12 next passes along another idler roller 20 and it is then dragged across a leveling device indicated generally at 21, and shown in perspective in Fig. 2. Such a device may consist of two disks 22 and 23 held in spaced apart position by a plurality of leveling bars 24. Preferably, such leveling bars appear in groups of three as shown. The entire device is rotatable and each group of bars may be individually rotatable. Such an arrangement provides a convenient, quick and easy means for changing the leveling bars as their efficiency becomes impaired. For example, only one bar is used although, if desired, two bars can be so arranged so that the coating composition is contacted thereby. However, when one is used and its wiping efficiency has been impaired, one or two of the other bars of the group can be rotated into operative position. When all three rods of the series have been so used the entire unit is turned so that a new series of three rods is brought into position next to the web for the purpose of leveling the coating composition. Individual bars can be removed from time to time for cleaning or replacement purposes.

It is essential in practicing the invention that a leveling bar or bars be used to provide a level surface to the priming coat 19 and this is accomplished as the coating on the web 12 is dragged across the bar 24 and the result will be that indicated at 25 in Fig. 3. It will be understood that it is essential that the hemispherical deposits indicated at 19 is leveled or smoothed in this manner; otherwise they would only tend to amplify the imperfections already present in any type of web upon which a coating composition is applied and, in particular, when such a web is of a cellulosic stock. Also, the smoothing and leveling action of the bar 24 will tend to provide the proper concentration and substantially equalized dispersion of magnetic sensitive particles in the final composite unit.

I have found that it is essential that such a priming layer or coat should have a thickness, when dried, of about 0.00013 to 0.00020 of an inch.

The web next passes across idler rollers 26 in a circuitous direction. At intervals heat-producing lamps 27 can be utilized as an aid in drying the coating by driving off the solvent vapors and the web 12 is then wound around a rewind cylinder into a rewind roll for subsequent operations.

It should be noted that the description of the application of the priming or first fraction coat in practicing the invention has been set forth in such a manner for illustrative purposes only. It is within the contemplation of the invention that the priming coat and subsequent layers can be applied continuously by running the web or sheet through a conventional type gravure press. However, I find the present means of practicing the invention set forth in the foregoing description to be practical as well as preferable.

In order to provide a completely coated web it is necessary to have at least two more applications of the coating composition applied in the same manner in which the priming coat has been applied. This is accomplished by repeating the steps of the process of applying the priming coat until a composite coating of uniform thickness, consisting of at least three layers, has been built upon the web by repeatedly passing the rewound mill roll through the device depicted in Fig. 1.

After the third layer has been dried the coated web or sheet should contain an overall unit composite layer which has a final thickness of about 0.0004 to 0.0006 of an inch. Such a thickness of the coating composition, applied and arranged in individual layers, I have found will produce the desired results when the layers include a fractional priming layer adhesively secured to the web and at least two similar fractional layers built upon the priming layer. Such a composite final coating of three layers is indicated generally at 28 in Fig. 4 of the drawings. I have also found that while additional layers may be employed to provide maximum recording power and volume response, it is essential that at least three layers or strata be provided as described in order properly to practice the invention.

The subsequent coatings need not be similar in composition to the priming coat. That is to say, the subsequent layers may be of such composition that they are incompatible, i. e., will not react with each other. However, the third coat may be similar to the priming coat. This will prevent any of the applied coats from becoming fluid upon application of the next succeeding coat. Consequently, such dissimilar or incompatible coating provides a new result, namely, a novel so-called "flow-out" to produce an unexpected uniform thickness of a combined unit coating and dispersion of magnetic particles.

Examples of two of such incompatible coatings which will not react with each other are as follows:

| | | |
|---|---|---|
| 1. Metallic oxide pigment (not dispersion) | 70% | Solid compounds |
| 2. Vinyl resin (VYNS type—Bakelite Corportion) | 20% | |
| 3. Plasticizers | 10% | |
| | 100% | |

4. Solvents—Ketones 100—150 parts by weight.

| | Parts by weight |
|---|---|
| 1. Metallic oxide pigment (not dispersion) | 65 |
| 2. Polyvinyl acetal resin ("Alvar" of Shawinigan Chemicals of Canada) | 20 |
| 3. Alcohol soluble celluose nitrate | 10 |
| 4. Plasticizers | 5 |
| | 100 |

5. Solvents—alcohol and aromatic hydrocarbons—100 to 150 parts by weight.

The application of the coating in three layers as I have described will tend completely to eliminate any of the effect of imperfections of the stock which carries the coating so that such imperfections will not appreciably detract from the effectiveness of the exposed coating surface.

As hereinbefore indicated, the webs can be slit to provide tapes of any suitable size. Or disks, records or platens can be cut or stamped therefrom if it is desired to utilize such a coated material on any recording or reproducing machine suitable for the purpose.

It will thus be seen that the objects hereinbefore set forth may readily and efficiently be attained. Since certain changes in carrying out the above process, and certain modifications in the article which embody the invention may be made without departing from its scope, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. A method of applying an overall coating composition of viscous material containing a dispersion of magnetic sensitive particles onto a continuously running non-metallic web to provide magnetic recording and reproducing tape, which comprises the steps of applying an overall priming coat of said material, having a wet thickness falling within a range of about 0.0015 to 0.0020 of an inch, to said web, leveling and smoothing the surface of said priming coat, drying the leveled priming coat and repeating said steps until a composite coating of uniform thickness, consisting of at least three layers, has been built upon said web properly to concentrate and to provide substantially equalized dispersion of said particles, thereby to obtain maximum uniformity in magnetic recording power and volume response for said tape.

2. A method of applying an overall coating composition of viscous material containing a dispersion of magnetic sensitive particles onto a continuously running non-metallic web to provide magnetic recording and reproducing tape, which comprises the steps of applying an overall priming coat of said material to said web, leveling the overall surface of said primary coat so that it has a dry thickness of approximately 0.00013 to 0.00020 of an inch, drying the leveled priming coat and repeating said steps until a composite coating of uniform thickness, consisting of at least three layers, has been built upon said web properly to concentrate and to provide substantially equalized dispersion of said particles, thereby to obtain maximum uniformity in magnetic recording power and volume response for said tape.

3. A method of applying an overall coating composition of viscous material containing a dispersion of magnetic sensitive particles onto a continuously running non-metallic web to provide magnetic recording and reproducing tape, which comprises the steps of applying an overall priming coat of said material to said web, leveling and smoothing the surface of said priming coat, drying the leveled priming coat and repeating said steps until a complete unit coating of uniform thickness, consisting of at least three fractional layers, has been built upon said web, which unit coating has an overall dry thickness lying within a range of 0.0004 to 0.0006 of an inch properly to concentrate and to provide substantially equalized dispersion of said particles, thereby to obtain maximum uniformity in magnetic recording power and volume response for said tape.

4. An article of manufacture, which comprises a magnetic recording tape constituting a web of cellulosic material and a dried viscous coating composition containing a dispersion of magnetic sensitive particles, said coating composition consisting of a composite unit arranged in individual layers which includes a fractional priming layer, having a dry thickness lying within a range of 0.00013 to 0.00020 of an inch, secured to said web and at least two similar layers built upon said priming layers having properly concentrated and substantially equalized dispersion of said particles to obtain maximum uniformity in magnetic recording power and volume response for said tape.

5. An article of manufacture, which comprises a magnetic recording tape constituting a web of non-metallic material and a dried viscous coating composition containing a dispersion of magnetic sensitive particles, said coating composition consisting of a composite unit of at least three individual layers and having a unit overall dry thickness lying within a range of 0.0004 to 0.0006 of an inch having properly concentrated and substantially equalized dispersion of said particles to obtain maximum uniformity in magnetic recording power and volume response for said tape.

OSCAR JOSEPH DE SYLVA.

REFERENCES CITED

The following references are of record in the file of this patent:

UNITED STATES PATENTS

| Number | Name | Date |
|---|---|---|
| 1,949,840 | Languepin | Mar. 6, 1934 |
| 2,096,973 | Munch | Oct. 26, 1937 |
| 2,129,731 | Devlin | Sept. 13, 1938 |
| 2,227,843 | Quenelle | Jan. 7, 1941 |
| 2,418,479 | Pratt | Apr. 8, 1947 |
| 2,459,874 | Fay | Jan. 25, 1949 |

FOREIGN PATENTS

| Number | Country | Date |
|---|---|---|
| 459,884 | Great Britain | Jan. 18, 1937 |
| 466,023 | Great Britain | May 18, 1937 |